(12) United States Patent
Basol et al.

(10) Patent No.: US 7,550,070 B2
(45) Date of Patent: Jun. 23, 2009

(54) ELECTRODE AND PAD ASSEMBLY FOR PROCESSING CONDUCTIVE LAYERS

(75) Inventors: Bulent M. Basol, Manhattan Beach, CA (US); Jeffrey Bogart, Campbell, CA (US)

(73) Assignee: Novellus Systems, Inc., San Jose, CA (US)

( * ) Notice: Subject to any disclaimer, the term of this patent is extended or adjusted under 35 U.S.C. 154(b) by 520 days.

(21) Appl. No.: 11/347,669

(22) Filed: Feb. 3, 2006

(65) Prior Publication Data

US 2007/0181443 A1    Aug. 9, 2007

(51) Int. Cl.
*C25D 5/34* (2006.01)
(52) U.S. Cl. .................. 205/206; 205/205; 205/210; 205/640; 205/662; 205/668; 205/670; 204/212; 204/198; 204/199; 204/221; 204/224 R; 204/279
(58) Field of Classification Search ............ 204/212, 204/198, 199, 221, 224 R, 279; 205/96, 205/97, 133, 205, 206, 210, 640, 662, 663, 205/668, 670, 671
See application file for complete search history.

(56) References Cited

U.S. PATENT DOCUMENTS

| | | | |
|---|---|---|---|
| 5,567,300 A | 10/1996 | Datta et al. | |
| 5,862,605 A | 1/1999 | Horie et al. | |
| 6,004,880 A | 12/1999 | Liu et al. | |
| 6,074,546 A | 6/2000 | Sun et al. | |
| 6,090,239 A | 7/2000 | Liu et al. | |
| 6,176,992 B1 | 1/2001 | Talieh et al. | |
| 6,224,737 B1 | 5/2001 | Tsai et al. | |
| 6,245,676 B1 | 6/2001 | Ueno | |
| 6,251,235 B1 | 6/2001 | Talieh et al. | |
| 6,270,647 B1 | 8/2001 | Graham et al. | |
| 6,284,121 B1 | 9/2001 | Reid | |
| 6,303,014 B1 | 10/2001 | Taylor et al. | |
| 6,346,479 B1 | 2/2002 | Woo et al. | |
| 6,353,623 B1 | 3/2002 | Munks et al. | |
| 6,375,823 B1 | 4/2002 | Matsuda et al. | |
| 6,402,925 B2 | 6/2002 | Talieh | |
| 6,413,388 B1 | 7/2002 | Uzoh et al. | |
| 6,471,847 B2 | 10/2002 | Talieh et al. | |

(Continued)

FOREIGN PATENT DOCUMENTS

EP    1 063 696 A1    12/2000

(Continued)

OTHER PUBLICATIONS

Reid et al., "Factors influencing damascene feature fill using copper PVD and electroplating," *Solid State Technology*, Jul. 2000, 7 pages.

*Primary Examiner*—Bruce F Bell
(74) *Attorney, Agent, or Firm*—Knobbe, Martens, Olson & Bear, LLP

(57) ABSTRACT

An electrode assembly includes a distribution plate having a plurality of grooves that communicate with openings in an overlying polishing pad layer. The grooves include end openings that allow for draining of process solution, both during processing and subsequent cleaning/rinsing of the pad. Drainage occurs continually during processing, cleaning and rinsing, and so is constricted through the end openings relative to the grooves, to prevent wastage. The end openings are sufficiently large, however, to substantially completely drain fluids from the grooves between steps without delaying robotic motions.

21 Claims, 5 Drawing Sheets

U.S. PATENT DOCUMENTS

| | | |
|---|---|---|
| 6,482,656 B1 | 11/2002 | Lopatin |
| 6,497,800 B1 | 12/2002 | Talieh et al. |
| 6,506,103 B1 | 1/2003 | Ohmori et al. |
| 6,534,116 B2 | 3/2003 | Basol |
| 6,600,229 B2 | 7/2003 | Mukherjee et al. |
| 6,610,190 B2 | 8/2003 | Basol et al. |
| 6,653,226 B1 | 11/2003 | Reid |
| 6,676,822 B1 | 1/2004 | Talieh |
| 6,833,063 B2 | 12/2004 | Basol |
| 6,848,970 B2 | 2/2005 | Manens et al. |
| 6,867,136 B2 | 3/2005 | Basol et al. |
| 6,902,659 B2 | 6/2005 | Talieh |
| 6,936,154 B2 | 8/2005 | Basol et al. |
| 6,942,780 B2 | 9/2005 | Basol et al. |
| 6,958,114 B2 | 10/2005 | Talieh et al. |
| 2002/0130034 A1* | 9/2002 | Uzoh et al. ............. 204/224 R |
| 2003/0054729 A1 | 3/2003 | Lee et al. |
| 2004/0163950 A1* | 8/2004 | Emesh ................... 204/297.06 |
| 2006/0160478 A1* | 7/2006 | Donohue et al. ............ 451/285 |

FOREIGN PATENT DOCUMENTS

| | | |
|---|---|---|
| EP | 1 122 989 A2 | 8/2001 |
| JP | 11-238703 | 8/1999 |
| JP | 2000208443 A | 7/2000 |
| WO | WO 01/32362 | 5/2001 |

\* cited by examiner

ELECTRODE AND PAD ASSEMBLY FOR PROCESSING CONDUCTIVE LAYERS

CROSS-REFERENCE TO RELATED APPLICATIONS

This application is related to U.S. Pat. No. 6,534,116, issued Mar. 18, 2003.

FIELD

The present invention generally relates to semiconductor processing technologies and, more particularly, to an apparatus and method for processing conductive layers on substrates such as wafers.

BACKGROUND

Conventional semiconductor devices generally include a semiconductor substrate, usually a silicon substrate, and a plurality of sequentially formed dielectric interlayers such as silicon dioxide and conductive paths or interconnects made of conductive materials. Interconnects are usually formed by filling trenches etched into the dielectric interlayers with a conductive material. In an integrated circuit, multiple levels of interconnect networks laterally extend with respect to the substrate surface. Interconnects formed in different layers can be electrically connected using vias or contacts. A metallization process can be used to fill such features, e.g., via openings, trenches, with a conductive material to form pads, contacts and lines.

Copper and copper alloys have recently received considerable attention as interconnect materials because of their superior electromigration and low resistivity characteristics. The preferred method of copper metallization is electroplating. Electroplating can be performed using either electrochemical deposition (ECD) or electrochemical mechanical deposition (ECMD) to form a copper layer on a conductive surface of a wafer. In both processes, copper is deposited from a process solution (electrolyte) contacting the conductive surface, while a potential is applied between an electrode immersed in the solution and the conductive surface. However there are differences between the two processes. ECD processes form a non-planar copper layer on the wafer. This non-planar layer is typically subsequently planarized using either a chemical mechanical polishing (CMP) process or an electrochemical planarization process such as electrochemical mechanical polishing (ECMP) process. ECMP processes employ a polishing pad to polish the copper surface while an anodic potential is applied thereon.

On the other hand, an ECMD process forms a planar copper layer during the electrochemical deposition. In ECMD, the copper is deposited while the conductive surface of the wafer is mechanically swept by a pad. ECMD is described, e.g., in U.S. Pat. Nos. 6,176,992 and 6,534,116, the disclosures of which are incorporated herein by reference and involves simultaneous electroplating with intermittent sweeping of the top conductive surface to deposit a planar layer over a non-planar substrate. Forming a planar copper layer reduces the need for planarization during the copper removal step. The planar conductive layer can be removed by chemical etching, CMP, ECMP or electropolishing. Furthermore, since both ECMD and ECMP processes use a pad to sweep the surface of the wafer, they can be performed in the same process station using the same process solution, or using a deposition solution for the ECMD and a different electropolishing solution for the ECMP. In both processes, process solutions are supplied to the conductive surface while the wafer is rotated and/or moved laterally. A system capable of performing either or both ECMD and ECMP in the same process chamber is called an Electrochemical Mechanical Processing (ECMPR) system.

Whether in ECMD or ECMP, it is important to provide a constant flow of process solution to the conductive surface. The fresh process solution should be uniformly distributed on the conductive surface as it is swept by the pad. A better distributed process solution flow to the conductive surface significantly improves uniformity of deposition on, or removal of the material from, the substrate surface.

SUMMARY

In certain embodiments, an apparatus for use in electropolishing a conductive surface of a wafer utilizing a process solution comprises a distribution plate comprising a first surface and a second surface; at least one groove formed in the first surface to distribute the process solution thereon, the at least one groove including at least one opening extending between the at least one groove and the second surface to flow a process solution into the at least one groove, wherein the at least one groove includes an end opening configured to drain fluid from the at least one groove; and a polishing pad is attached on the first surface to polish the conductive surface using the process solution distributed by the at least one groove. In certain embodiments, a method of electropolishing a conductive surface by utilizing an assembly and a process solution comprises supplying a process solution to a first surface of a distribution plate and distributing the solution in grooves formed therein; flowing the process solution from the groove through a pad towards the conductive surface; draining the process solution from end openings of the grooves; and applying the pad to the conductive surface while electropolishing the conductive surface.

DETAILED DESCRIPTION

Figure 1A:
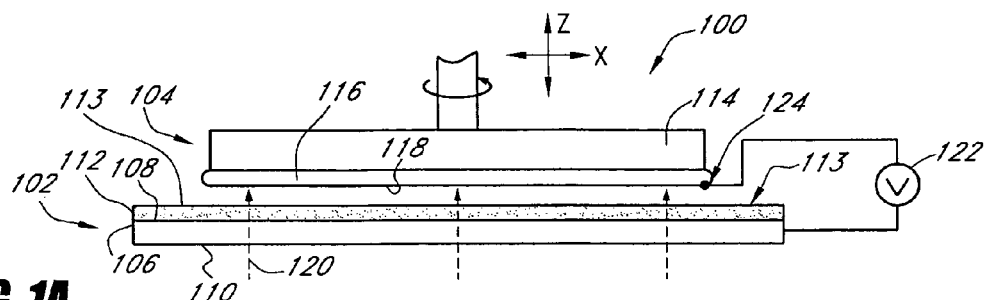
FIG. 1A is a schematic cross-sectional illustration of a system including an embodiment of an assembly of the present invention.

The preferred embodiments of the present invention provide methods and apparatus for uniformly distributing a process solution flow onto a conductive surface of a wafer during an electrochemical mechanical process that applies a pad, mask or a sweeper to the conductive surface as the conductive surface is electrochemically processed, particularly when a conductive material is removed or electropolished therefrom. In one embodiment, an assembly is used to uniformly distribute the process solution flow to the conductive surface of the wafer. Advantageously, the construction allows efficient cleaning of the pad without wasting excessive time or process solution.

The electrode assembly preferably includes a distribution plate and a pad layer attached to a first surface of the distribution plate. The plate either is an electrode for electroprocessing, preferably a cathode, or it overlies such an electrode and allows electric field to pass through the plate. The first surface of the distribution plate includes grooves formed in the first surface. Grooves may extend along the first surface and at least one open end of the grooves terminates at the edge of the distribution plate. Openings are formed at the bottom of the grooves and the openings extend from the floor the grooves through the thickness of the plate to a second surface of the distribution plate opposite the first surface. When a solution is supplied to the second surface of the distribution plate at a given pressure, the solution flows through the openings in the distribution plate, fills the grooves in the first surface and flows through channels in the pad towards the conductive surface of the wafer.

The conductive surface of the wafer is placed across from the first surface of the distribution plate. Excess solution is continuously drained through the at least one open end of the grooves as the solution is used. The size of the open end(s) of the grooves may be adjusted to optimize the solution drainage. For example they may be made narrower than the overall groove width in order not to waste too much solution but at the same time allow drainage of the used solution so that stable processing of the surface and better process results may be obtained. On the other hand, the open ends are preferably large enough (in cross-sectional surface area) to fully drain process solution after processing and before cleaning, or to fully drain cleaning and/or rinse fluid after a pad cleaning step and before loading the next wafer. In other words, the selected size(s) of the open end(s) of the grooves control, e.g., accelerate or slow down, the draining of the process solution. The size of the groove open ends will be further discussed with respect to their function in the method of FIG. 8.

In one embodiment, the entire body of the distribution plate or at least the first surface may be conductive and may be used as an electrode. A potential difference is applied between the first surface of the distribution plate and the conductive surface.

In another embodiment, the distribution plate is electrically isolated from an electrode which is placed across from the second surface of the distribution plate, opposite the first surface. During the electrochemical process, a potential difference is applied between the conductive surface and the electrode. The electrode may have openings allowing solution to flow through it and towards the second surface of the distribution plate. Openings in the distribution plate allow solution to flow through it and also at the same time control the distribution of current density on the conductive surface of the substrate during electrochemical processing.

FIG. 1A shows an electrochemical mechanical processing system 100 having a first assembly 102 for electropolishing and a second assembly 104 for wafer support. The system 100 is capable of performing electrochemical mechanical processes, and particularly electrochemical mechanical polishing (ECMP). The first assembly 102 includes a distribution plate 106 having a first surface 108 facing the substrate and a second surface 110 facing away from the substrate. A pad layer 112 or pad having a polishing surface 113 is attached to the first surface 108 of the distribution plate 106. The second assembly 104 comprises a carrier 114 to hold a substrate or wafer 116 having a conductive surface 118. The conductive surface 118 is held across from the first surface 108 of the distribution plate 106, with the pad layer 112 intervening. The carrier 114 may rotate and laterally move the wafer 116 during the process. As will be described more fully below, a process solution 120 flows through the first assembly 102 towards the conductive surface 118. As will be described in detail, the distribution plate 106 of the present invention uniformly distributes the process solution flow that is delivered to the conductive surface 118, and also allows for drainage of the solution.

During the electrochemical mechanical process, a potential difference is applied between the conductive surface 118 and the distribution plate 106 by a power supply 122, and a relative motion is established between the conductive surface 118 and the pad 112 while they are in physical contact. In this embodiment, as is understood, the distribution plate acts as an electrode of the electrochemical mechanical processing system. Preferably, the desired process is an electrochemical mechanical material removal or electrochemical mechanical polishing and the distribution plate 106 is accordingly made more cathodic than the conductive surface 118 (i.e., becomes a cathode electrode). It should be understood that when used as an electrode the distribution plate 106 may only be partially conductive. For example the distribution plate 106 may itself be insulating but its first surface 118 may be conductive. In this case, the potential is applied to the conductive portion (not shown) of the distribution plate 106. Electrical contact to the conductive surface may be made using movable electrical contacts 124. During the process a relative motion is established between the movable contacts 124 and the conductive surface 118. Examples of movable contacts can be found in U.S. Pat. Nos. 6,497,800 and 6,610,190, which are owned by the assignee of the present invention. The disclosures of these references are incorporated herein by reference for the purpose of describing configurations for establishing relative motion with movable contacts 124.

Figure 1B:
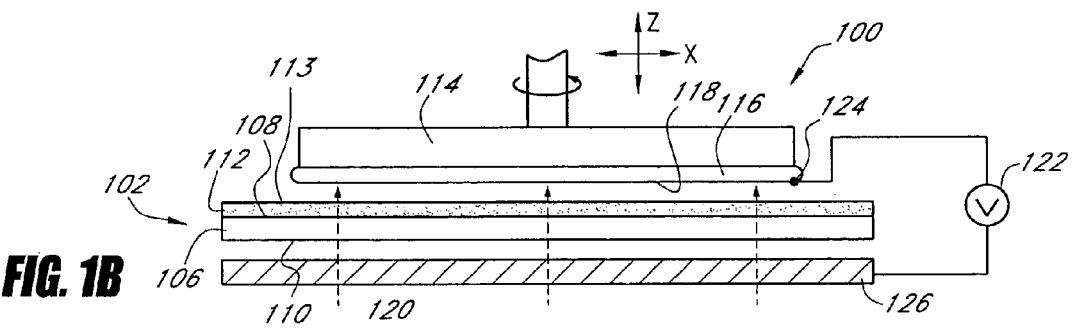
FIG. 1B is a schematic cross-sectional illustration of a system including another embodiment of an assembly of the present invention.

FIG. 1B shows an alternative embodiment of the system 100 which includes an electrode 126 configured to apply the potential difference between the electrode 126 and the conductive surface 118. The electrode 126 is placed across from the second surface 110 of the distribution plate 106 and may be porous to allow the solution 120 to flow therethrough. Since the system 100 includes the electrode 126, the distribution plate 106 may be made of an insulating material such as a polymer or ceramic. In this case, the electrode 126 may be attached to the second surface 110 of the distribution plate 106 or spaced apart from the second surface 110 as shown in FIG. 1B. The distribution plate 106 shown in FIG. 1B may also be made of a conductor. If the distribution plate 106 is a conductor, it can be electrically isolated from the electrode 126 by placing a gap (shown) or an insulator (not shown) between the distribution plate 106 and the electrode 126.

Figure 2A:
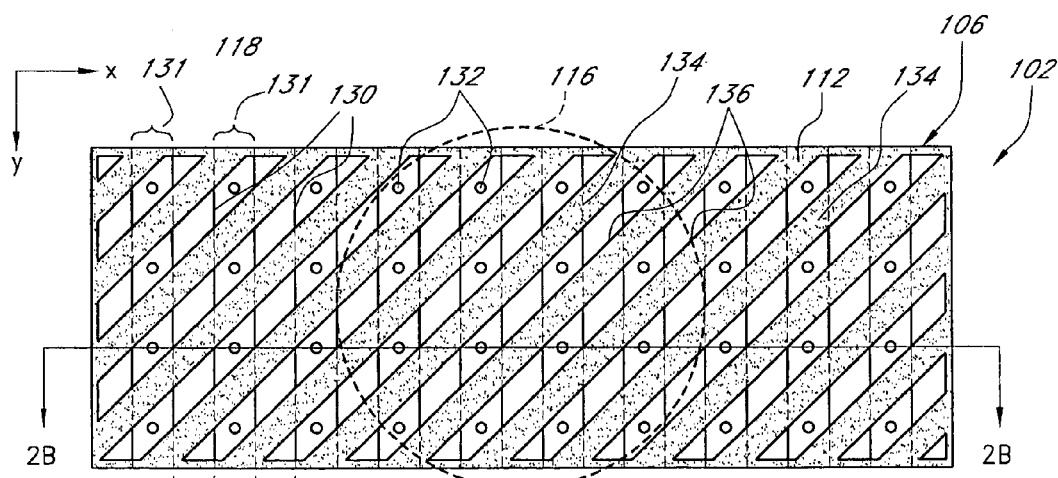
FIG. 2A is a schematic plan view of an embodiment of an assembly including a pad layer and a distribution plate.
Figure 2B:
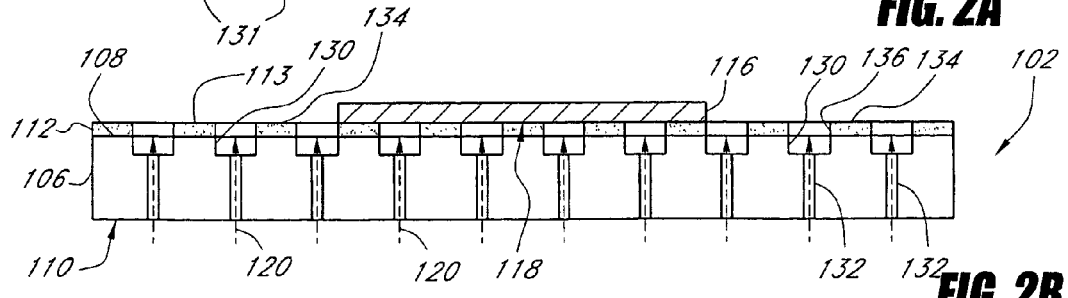
FIG. 2B is a schematic cross section of the assembly shown in FIG. 2A taken along lines 2B-2B.

FIGS. 2A and 2B show, in more detail, an exemplary structure of the first assembly 102 of the present invention in plan view and in cross sectional view, respectively. As shown in FIGS. 2A and 2B, the distribution plate 106 of the first assembly 102 has preferably a rectangular shape, although it may be round or other shapes as will later described. A series of elongated grooves 130 are formed in the first surface 108 of the distribution plate 106. The grooves 130 are in fluid connection with the second surface 110 of the distribution plate 106 through openings 132 so that the process solution 120 delivered to the second surface 110 flows through the openings 132 and fills the grooves 130. The grooves 130 are formed and distributed across the first surface 108 and may be parallel to the short (shown) or the long edge of the distribution plate 106. The grooves 130 may also be distributed in different patterns and forms on the first surface including in cross-hatched manner, circular, oval etc. The grooves 130 may have a U-shaped profile or rectangular profile. An exemplary width and depth range for the grooves may be in the range of 0.5-3 mm width and 0.5-10 mm depth, respectively.

The grooves 130 terminate at end openings 131 placed at the edge of the distribution plate 106. The end openings 131 may have the same width and depth of the grooves or, as will be shown in one of the embodiments below, the end openings 131 may have a narrower width and/or a different depth. The exemplary pad layer 112 is disposed on the first surface 108 and includes channels 136 or openings that communicate with the underlying grooves 131 so that the solution 120 filling the grooves 131 flows towards the conductive surface 118 of the wafer 116. As the process solution is delivered towards the conductive surface 118, it is uniformly and fully distributed from under the pad layer 112 across the first surface 108 and some of the solution is continuously drained through the end openings 131. Used process solution is drained through the end openings 131 once the process is complete. Grooves 130 distribute the process solution over the distribution plate 106 and cause the solution to be delivered to the conductive surface 118 of the wafer 116 in a uniform and efficient manner because solution can flow through the grooves 130 even under the pad layer 112 due to non-coextensive plate grooves 130 and pad channels 136 (crossing pattern in the illustrated embodiment). This way solution distribution is independent of the shape and form of the pad layer 112.

The pad layer 112 shown in FIG. 2A is comprised of exemplary pad strips 134 separated by the channels 136. However, the pad layer may be made of one or more pieces of pad layer portions in any shape and form. In this respect, the openings or channels 136 may have any shape and geometry. Accordingly, the pad strips 134 in FIG. 2A may be oriented in any possible way, for example in patterns parallel to or crossing the grooves 130. In FIG. 2A, the strips 134 and hence the channels 136 are placed in a slanted pattern so that the strips 134 of the pad layer 112 bridge over the grooves 130 while the pad channels 136 periodically intersect with underlying plate grooves 130. It is important that the width of the grooves 130 is optimized so that the strips 134 or pad portions placed over the grooves do not sag into the grooves 130 when the wafer 116 and the pad layer 112 come into contact. Sagging of the pad layer 112 portions into the grooves 130 may be prevented by controlling the groove width and making them narrow or including a rigid support layer (not shown) at the bottom of the pad layer 112.

Figure 3A:
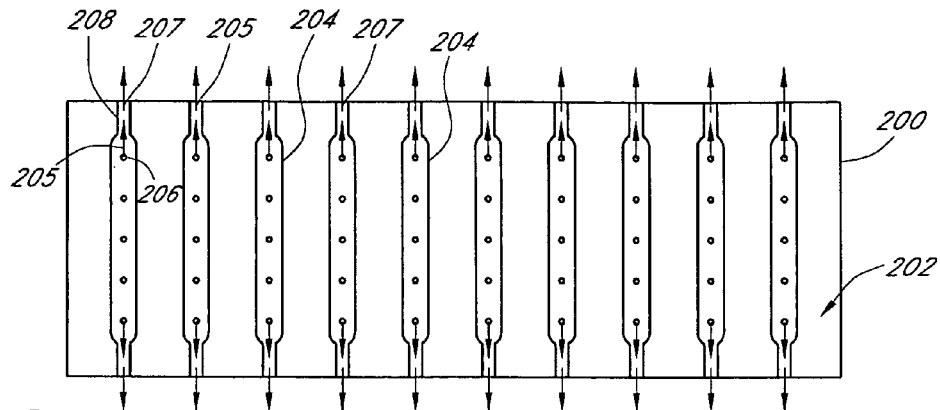
FIGS. 3A-3B are schematic plan and isometric illustrations of an embodiment of a distribution plate.

FIG. 3A shows an embodiment of a distribution plate 200 in plan view. A first surface 202 (for facing the wafer) of the distribution plate 200 includes grooves 204. A process solution 205 is flowed into the grooves through openings 206 in the grooves 204. In this example, the grooves 204 extend along the first surface 202 in parallel fashion. However, the grooves may be formed in non-parallel patterns and may cross one another. As shown in FIG. 3A, end openings 207 are connected to the grooves 204 with narrow sections 208. The narrow sections 208 are extension of the grooves but with reduced cross-sectional area. Preferably the grooves 204 have an average cross-sectional area (excluding the narrow sections 208) of 0.005 cm$^2$ to 0.05 cm$^2$, whereas the narrow sections 208 preferably each has an average cross-sectional area of 0.002 cm$^2$ to 0.03 cm$^2$. More generally, the cross-sectional area of the narrow sections 208 preferably is 30% to 70% less than the remainder of the grooves 204. It will be understood that "narrow" grooves 208 is a convenient label, but that the grooves can instead or in addition be pinched by reducing the depth near the end openings 207.

The reduced cross-section of the groove slows down the draining of the process solution and makes more solution available for the processing of a wafer surface during the process with minimal waste. However, after processing stops and the wafer surface is moved away from the pad, end openings allow draining of the used solution left in the channels between the pad portions. For saving solution, it is advisable to cut off the solution flow during this time when wafer surface is not being processed. This way, when the new wafer arrives and processing re-starts, the new solution delivered to the wafer surface does not mix extensively with the remaining used solution on the surface of the distribution plate. This, in turn, improves process stability and repeatability. Time for effectively cleaning the electrode assembly is also reduced, and rinse water drained after cleaning, since added cleaning solution or rinse water does not have to purge remaining solution during cleaning, and added process solution does not have to purge or get diluted by remaining rinse water in the grooves after cleaning.

Figure 3B:
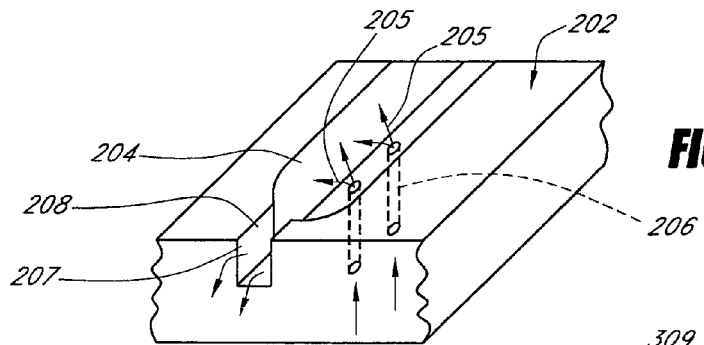

FIG. 3B shows a partial perspective view of one of the grooves 130 in the distribution plate 202. The process solution 205 flows into the groove 204 through the openings 206. The excess solution leaves the groove from the end opening 207 by flowing the through the narrow section 208.

Figure 4A:
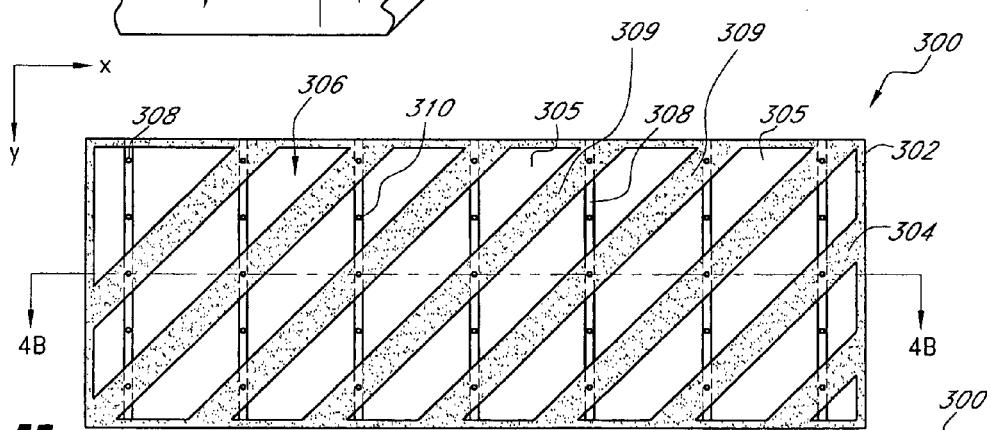
FIGS. 4A-4C are schematic plan, cross-section and isometric illustrations of an embodiment of a distribution plate.
Figure 4B:
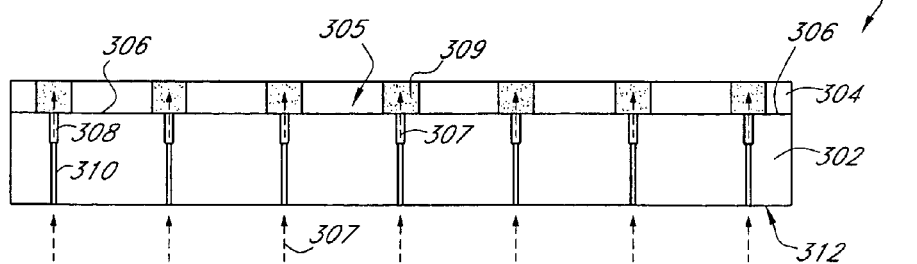
Figure 4C:
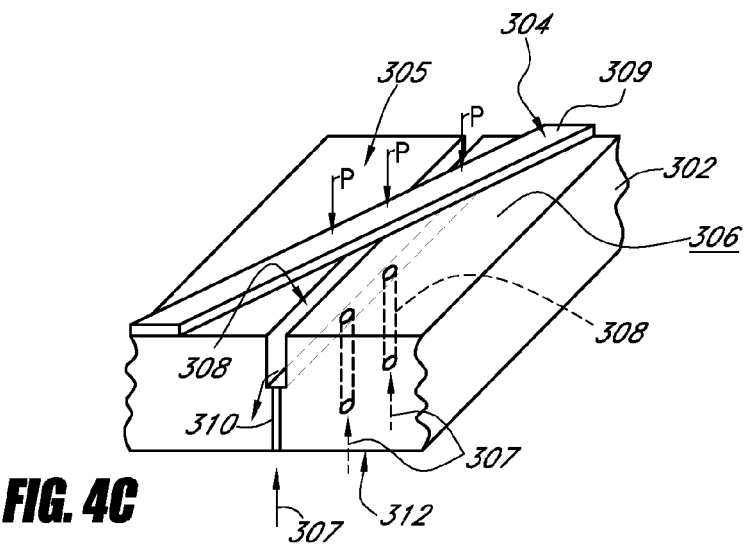

FIGS. 4A and 4B shows an exemplary electrode assembly 300 including a distribution plate 302 and a pad layer 304 attached to a first surface 306 of the distribution plate 302. In this embodiment, width of the grooves 308 is reduced so that pad layer portions 309 crossing over the grooves 308 are sufficiently supported and no sagging of the pad layer portions 309 into the grooves 308 occurs during the process. As shown in FIG. 4C, the pad portion 309 supports itself over the groove 308 without sagging as pressure P of a wafer is applied. Openings 310 connect the grooves 308 to a second surface 312 of the distribution plate 302 to flow a process solution 307 as described above.

Figure 5:
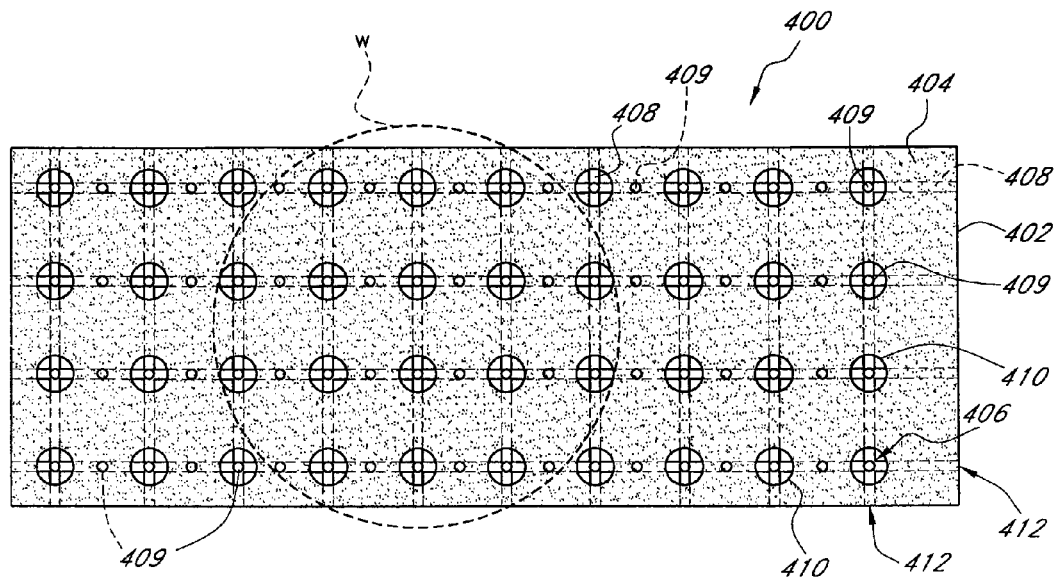
FIG. 5 is a schematic plan view of an embodiment of an assembly including a pad layer and a distribution plate.

FIG. 5 shows an embodiment of an electrode assembly. The assembly 400 includes a distribution plate 402 and a pad layer 404 attached to a first surface 406 of the distribution plate 402. In this embodiment, grooves 408 cross one another and extend across the first surface 406 of the distribution plate 402. Solution openings 409 in the grooves 408 flow a solution from the bottom of the plate 402 into the grooves 408 as described in the above embodiments. The pad layer 404 includes pad openings 410 to flow a process solution from the grooves 408 towards a surface of a wafer W (the position of the wafer is shown by a dotted circle). The wafer also sees electric field through the pad openings 410 from the cathodic plate 402 or underlying electrode for electropolishing. During the process, solution continually leaves the distribution plate 402 from end openings 412.

Figure 6:
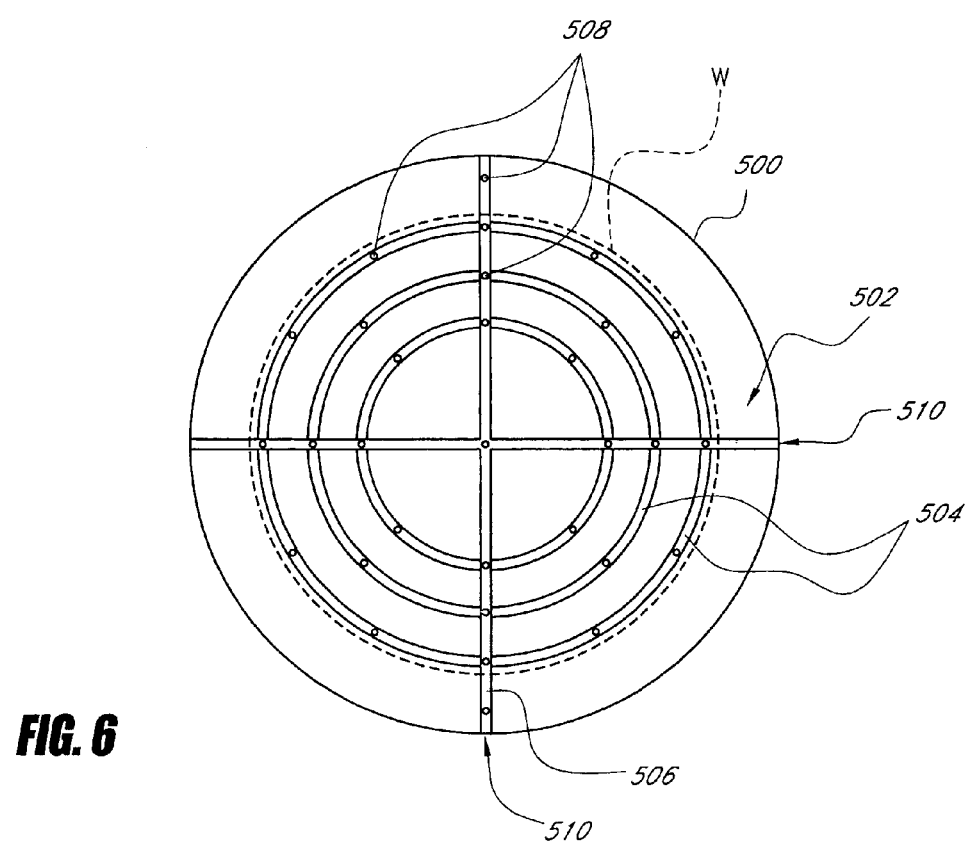
FIG. 6 is a schematic plan view of an embodiment of a distribution plate.

FIG. 6 shows an embodiment of a distribution plate 500 having a circular shape. A pad layer (not shown) including either the above-described channels or pad openings is attached on the distribution plate. The position of a wafer W is shown by a dotted circle. During the process the wafer is polished by the pad layer on the distribution plate 500. A circular shape of the distribution plate 500 facilitates rotation of the distribution plate 500 during the process by a moving mechanism attached to the distribution plate 500 (not shown).

Of course, the process can be performed by rotating at least one of the distribution plate and the wafer W. Grooves are formed in a first surface 502 (facing the wafer) of the distribution plate 500 as concentric grooves 504 and radial grooves 506. Solution openings 508 flow a process solution into the grooves 504, 506 as described for the above embodiments. In this embodiment, the circular grooves 504 distribute the process solution over the distribution plate 500 while the radial grooves 506 distribute and drain the process solution. Process solution over the distribution plate 500 is drained from end openings 510.

Figure 7:
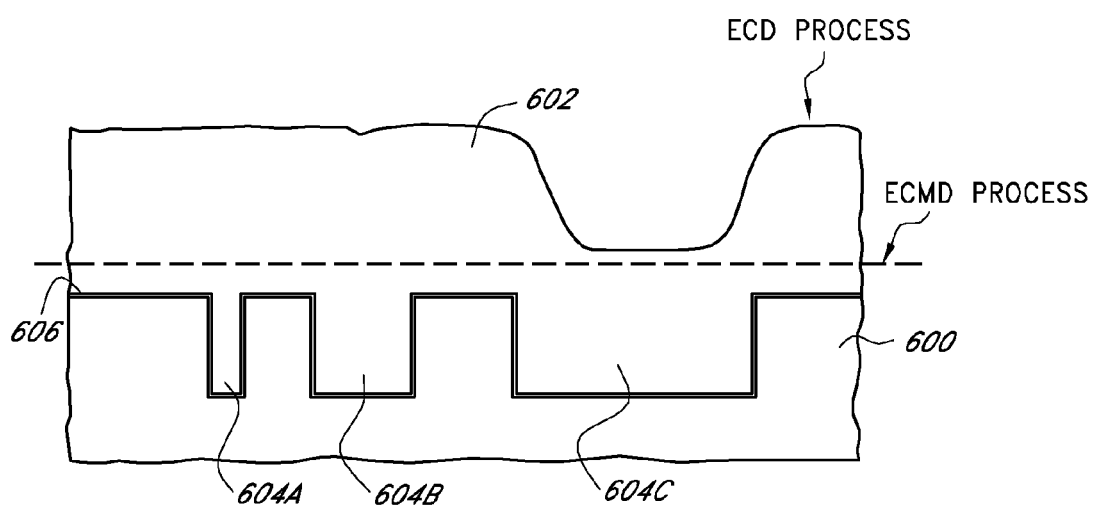
FIG. 7 is a schematic cross section of a substrate including a conductive layer to be electropolished.

FIG. 7 shows an exemplary substrate including a copper layer 602 which is a non-planar layer deposited using ECD process. The substrate may include a dielectric layer 600 and include features 604A (a via), 604B (a mid-size trench) and 604C (a large trench) to be filled with interconnect contact, lines, and pads. The features are lined with a barrier layer 606 such as a Ta or TaN layer. A copper seed layer (not shown) may also cover the barrier layer 606. Copper layer 602 may be planarized using the above-described embodiments for ECMP.

As mentioned above, the above embodiments are also used to deposit a planar copper layer (shown by dotted line) using an ECMD process. This planar layer can be also further planarized by applying ECMP process using the above described embodiments.

Figure 8:
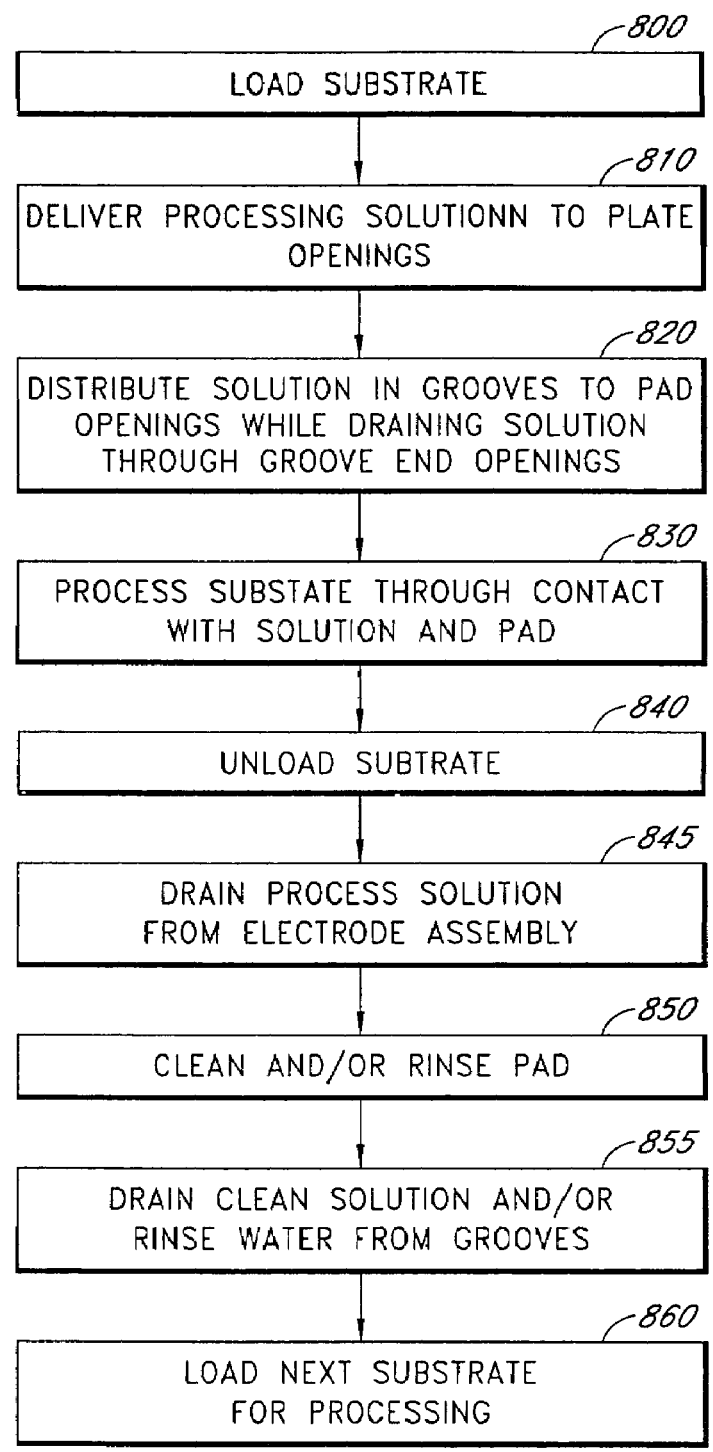
FIG. 8 is a flow chart illustrating a method of processing with an electrode/pad assembly in accordance with the preferred embodiments.

FIG. 8 is a flow chart illustrating an exemplary process of employing the apparatus herein above in the various embodiments. Initially, a substrate is loaded 800 onto the wafer carrier for processing. Processing solution, particularly electrolyte conducive to electropolishing, is delivered 810 through openings that extend from the bottom surface of the distribution plate. From the lateral plate grooves, this solution is distributed 820 to the pad openings or channels that intersect with the plate grooves. The substrate is then processed 830 while the solution continues to be distributed, and while the wafer and pad layer overlying the distribution plate are pressed into contact, along with relative lateral motion such as rotation and/or translation of the wafer relative to the electrode assembly. Solution continues to flow during this process. At the same time, solution drains out of the groove end openings, which are preferably of smaller cross-section than the remainder of the plate grooves as described above.

Subsequently, after processing is complete, the substrate is unloaded 840. Process solution flow stops and used process solution drains 845 substantially completely before the electrode assembly is cleaned and/or rinsed 850. As noted above, prior to moving to the cleaning/rinsing step 850, or as the apparatus is prepared for such clean/rinse processing 850, used solution drains 845 from the groove end openings and is preferably completely drained away prior to the clean/rinse process 850. Accordingly, the time for cleaning/rinsing is reduced because the remaining solution in the grooves is greatly reduced by the drainage. Furthermore, during cleaning/rinsing 850, the cleaning solution itself drains away during the process such that the impurities from that process are washed away more easily and do not remain in the pad assembly, (particularly in the grooves) when the next process starts. Similarly, any rinsing solution or deionized water (DI water) continually drains away during the clean/rinse process 850. Accordingly, drainage 860 improves efficiency and less solution is wasted in the next process step. Preferably, organic acids and mechanical action from a brush aid the pad cleaning process.

After cleaning/rinsing 850, while the next wafer is loaded 860, sufficient time is provided for the clean and/or rinse solution to drain away 855 from the electrode assembly. Preferably the groove end openings are sufficiently large to allow substantially complete drainage from the electrode assembly within about 20 seconds to 2 minutes, and more preferably within about 30 seconds to 60 seconds. Thus, the cross-sectional area of the groove end openings are selected relative the total volume of the grooves within the plate to accomplish such drainage. The skilled artisan will appreciate that drainage can be considered "substantially complete" when fluid starts to drip, rather than continually flow, out the groove end openings. When solution is next delivered 810 for the subsequent substrate, the solution is not diluted by remaining cleaning solution and/or rinse water in the grooves, such that less solution needs to be applied.

Counter intuitively, the provision of groove end openings that allow continuous draining of solution from the electrode assembly can improve the efficiency of solution use, in addition to reducing time. This is because the end openings can be pinched to reduce the rate of drainage, and yet substantially complete drainage 845 can still be accomplished between the end of a wafer processing step 830 and the beginning of a clean/rinse process 850, and also substantially complete drainage 855 can occur between the end of a clean/rinse process 850 and the beginning of the subsequent fluid delivery 810 to start substrate processing 830. Accordingly, solution is not diluted by substantial remaining cleaning solution or DI water in the grooves, and less solution needs to be applied before processing 830 can begin with an undiluted solution. Alternatively, or in addition, less time needs to be spent during cleaning and rinsing, since the cleaning and rinsing fluids are not diluted by and need not purge substantial residual used process solution. Advantageously, substantially complete drainage occurs between steps without requiring the robotic motions to pause relative to their inherent pace.

Although various preferred embodiments have been described in detail above, those skilled in the art will readily appreciate that many modifications of the exemplary embodiment are possible without materially departing from the novel teachings and advantages of this invention.

We claim:

1. A method of electropolishing a conductive surface by utilizing an assembly and a process solution, comprising:
   supplying a process solution to a first surface of a distribution plate;
   distributing the solution to grooves formed in a second surface of the distribution plate;
   flowing the process solution from the groove through a pad towards the conductive surface;
   draining the process solution from end openings of the grooves, wherein draining the process solution comprises substantially completely draining the process solution from the grooves after stopping supplying the process solution and before cleaning the pad; and
   applying the pad to the conductive surface while electropolishing the conductive surface.

2. The method of claim 1 further comprising cleaning the pad after electropolishing the conductive surface.

3. The method of claim 1, further comprising substantially completely draining cleaning/rinse fluid after cleaning the pad and prior to processing a subsequent conductive surface.

4. The method of claim 1 wherein electropolishing comprises applying a potential difference between the conductive surface and the distribution plate.

5. The method of claim 1 wherein electropolishing comprises applying a potential difference between the conductive surface and an electrode adjacent the distribution plate.

6. A method of electropolishing a conductive surface by utilizing an assembly and a process solution, comprising:

supplying a process solution to a first surface of a distribution plate;

distributing the solution to grooves formed in a second surface of the distribution plate;

flowing the process solution from the grooves through a pad towards the conductive surface;

draining the process solution from end openings of the grooves, wherein substantially completely draining is accomplished within about 20 seconds to 2 minutes after stopping supplying the process solution; and applying the pad to the conductive surface while electropolishing the conductive surface.

7. The method of claim 6 wherein substantially completely draining the process solution is accomplished within about 30 seconds to 60 seconds after supplying the process solution.

8. A method of electropolishing a conductive surface by utilizing an assembly and a process solution, comprising:

supplying a process solution to a first surface of a distribution plate;

distributing the solution to grooves formed in a second surface of the distribution plate;

flowing the process solution from the grooves through a pad towards the conductive surface;

draining the process solution from end openings of the grooves, wherein the end openings of the grooves are constricted relative to a remainder of the grooves; and applying the pad to the conductive surface while electropolishing the conductive surface.

9. The method of claim 8 wherein draining process solution from end openings of the grooves comprises continually draining the process solution while supplying the process solution.

10. The method of claim 8, wherein draining the process solution comprises substantially completely draining the process solution from the grooves after electropolishing and prior to cleaning.

11. An apparatus for use in electropolishing a conductive surface of a wafer utilizing a process solution, comprising:

a distribution plate comprising a first surface and a second surface;

at least one groove formed in the first surface to distribute the process solution thereon, the at least one groove including at least one opening extending between the at least one groove and the second surface to flow a process solution into the at least one groove, wherein the at least one groove includes an end opening configured to drain fluid from the at least one groove, wherein the end opening has a cross-sectional surface area between about 0.002 cm$^2$ and 0.03 cm$^2$; and a polishing pad is attached on the first surface to polish the conductive surface using the process solution distributed by the at least one groove.

12. The apparatus of claim 11, wherein the end opening is located at the edge of the distribution plate.

13. The apparatus of claim 11, wherein the at least one groove comprises a plurality of grooves.

14. An apparatus for use in electropolishing a conductive surface of a wafer utilizing a process solution, comprising:

a distribution plate comprising a first surface and a second surface;

at least one groove formed in the first surface to distribute the process solution thereon, the at least one groove including at least one opening extending between the at least one groove and the second surface to flow a process solution into the at least one groove, wherein the at least one groove includes an end opening configured to drain fluid from the at least one groove, wherein the end opening has a cross-sectional surface are between about 30% and 70% less than an average cross-sectional surface of the remainder of at least one groove; and a polishing pad is attached on the first surface to polish the conductive surface using the process solution distributed by the at least one groove.

15. An apparatus for use in electropolishing a conductive surface of a wafer utilizing a process solution, comprising:

a distribution plate comprising a first surface and a second surface;

at least one groove formed in the first surface to distribute the process solution thereon, the at least one groove including at least one opening extending between the at least one groove and the second surface to flow a process solution into the at least one groove, wherein the at least one groove includes an end opening configured to drain fluid from the at least one groove, wherein the at least one groove includes a narrow section terminating in the end opening, the narrow section having a cross-sectional surface area less than a remainder of the at least one groove; and a polishing pad is attached on the first surface to polish the conductive surface using the process solution distributed by the at least one groove.

16. An apparatus for use in electropolishing a conductive surface of a wafer utilizing a process solution, comprising:

a distribution plate comprising a first surface and a second surface;

at least one groove formed in the first surface to distribute the process solution thereon, the at least one groove including at least one opening extending between the at least one groove and the second surface to flow a process solution into the at least one groove, wherein the at least one groove includes an end opening configured to drain fluid from the at least one groove, wherein the at least one groove comprises a plurality of grooves, wherein the plurality of grooves extend without crossing one another; and a polishing pad is attached on the first surface to polish the conductive surface using the process solution distributed by the at least one groove.

17. The apparatus of claim 16 wherein the polishing pad comprises channels communicating with the plurality of grooves.

18. The apparatus of claim 16 further comprising a power supply connected to the distribution plate.

19. The apparatus of claim 16, wherein an electrode is placed facing the second surface and isolated from the distribution plate.

20. The apparatus of claim 16 wherein the plurality of grooves have a plurality of end openings configured to drain fluid from the plurality of grooves, wherein a ratio of total groove volume to total end opening cross-sectional surface area is such as to allow full drainage of fluid from the plurality of grooves within 20 seconds to 2 minutes.

21. The apparatus of claim 16 wherein the plurality of grooves have a plurality of end openings configured to drain fluid from the plurality of grooves, wherein a ratio of total groove volume to total end opening cross-sectional surface area is such as to allow full drainage of fluid from the plurality of grooves within 30 seconds to 60 seconds.

* * * * *

UNITED STATES PATENT AND TRADEMARK OFFICE
CERTIFICATE OF CORRECTION

PATENT NO. : 7,550,070 B2
APPLICATION NO. : 11/347669
DATED : June 23, 2009
INVENTOR(S) : Bulent M. Basol et al.

It is certified that error appears in the above-identified patent and that said Letters Patent is hereby corrected as shown below:

In the drawings, Sheet 5 of 5, FIG. 8, replace with the following:

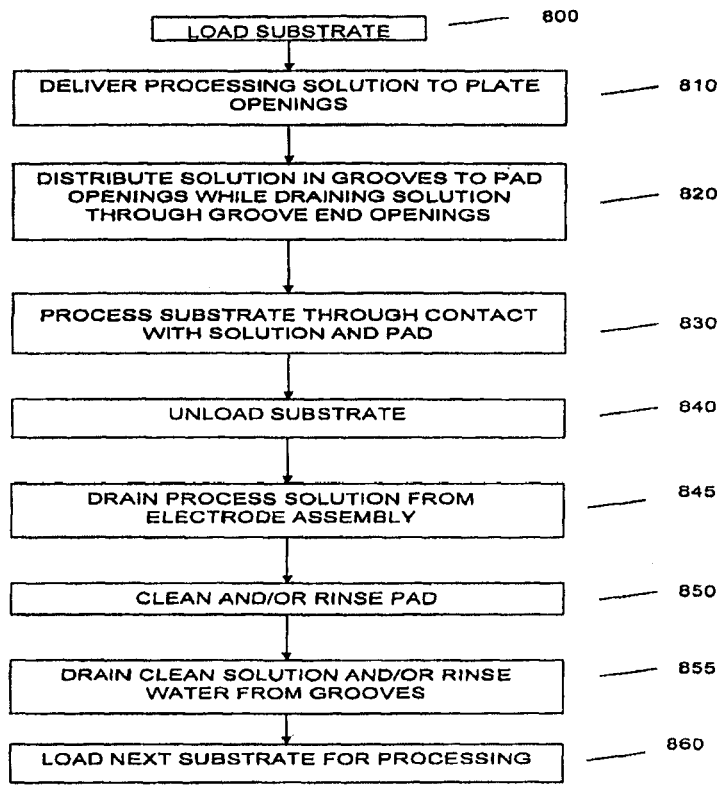

FIG. 8

Signed and Sealed this

Fifteenth Day of June, 2010

David J. Kappos
*Director of the United States Patent and Trademark Office*

CERTIFICATE OF CORRECTION (continued)
U.S. Pat. No. 7,550,070 B2

At Column 8, Line 55, in Claim 2, change "1" to --1,--.

At Column 8, Line 60, in Claim 4, change "1" to --1,--.

At Column 8, Line 63, in Claim 5, change "1" to --1,--.

At Column 9, Line 13, in Claim 7, change "6" to --6,--.

At Column 9, Line 29, in Claim 9, change "8" to --8,--.

At Column 10, Line 3, in Claim 14, change "are" to --area--.

At Column 10, Line 4, in Claim 14, after "surface" insert --area--.

At Column 10, Line 44, in Claim 17, change "16" to --16,--.

At Column 10, Line 47, in Claim 18, change "16" to --16,--.

At Column 10, Line 52, in Claim 20, change "16" to --16,--.

At Column 10, Line 58, in Claim 21, change "16" to --16,--.